United States Patent [19]

Sampson et al.

[11] Patent Number: 4,767,179
[45] Date of Patent: Aug. 30, 1988

[54] FIBER OPTIC CONNECTOR ASSEMBLY

[75] Inventors: Stephen A. Sampson, Downers Grove; Kenneth J. Adamik, Westchester, both of Ill.

[73] Assignee: Molex Incorporated, Lisle, Ill.

[21] Appl. No.: 450,967

[22] Filed: Dec. 20, 1982

[51] Int. Cl.⁴ .......................... G02B 6/36; H01J 5/16
[52] U.S. Cl. ................................ 350/96.20; 350/96.18; 250/227
[58] Field of Search ............... 350/96.17, 96.20, 96.18, 350/96.21, 96.15, 96.22; 250/227

[56] References Cited

U.S. PATENT DOCUMENTS

| | | | |
|---|---|---|---|
| 4,025,776 | 5/1977 | Cawood et al. | 350/96.24 |
| 4,118,105 | 10/1978 | Voigt | 350/96.20 |
| 4,277,135 | 7/1981 | Schrott et al. | 350/96.21 |
| 4,376,566 | 3/1983 | Blackington | 350/96.20 |
| 4,411,491 | 10/1983 | Larkin et al. | 350/96.20 |
| 4,427,879 | 1/1984 | Becher et al. | 250/227 X |
| 4,439,006 | 3/1984 | Stevenson | 350/96.20 |
| 4,640,575 | 2/1987 | Dumas | 350/96.20 |
| 4,673,242 | 6/1987 | Logan et al. | 350/96.20 |
| 4,674,831 | 6/1987 | Bagby | 350/96.20 |
| 4,687,291 | 8/1987 | Stape et al. | 350/96.21 |

OTHER PUBLICATIONS

Noel et al., "Safety Closure ... Devices", I.B.M. Tech. Discl. Bull., vol. 22, No. 6, Nov. 1979, pp. 2393–2394.

Primary Examiner—William L. Sikes
Assistant Examiner—Brian M. Healy
Attorney, Agent, or Firm—Louis A. Hecht; John W. Cornell

[57] ABSTRACT

An improved fiber optic connector assembly which includes an optoelectronic device, a housing to receive the optoelectronic device, said housing having an opening to receive therethrough a plug which mounts an optic fiber. The plug is electrically insertable into the housing through the opening in alignment with the optoelectronic device. A resilient door is provided the housing which normally covers and is biased against the opening when the plug is not inserted in the housing. The door is movable away from the opening in response to the insertion of the plug therethrough.

5 Claims, 2 Drawing Sheets

4,767,179

FIBER OPTIC CONNECTOR ASSEMBLY

BACKGROUND OF THE INVENTION

1. Field of the Invention

The present invention generally relates to fiber optic connector assemblies and, more particularly, an assembly for connecting an optoelectronic device with an optic fiber.

2. Brief Description of the Prior Art

The science of fiber optics is becoming more popular in view of the capability of transmitting one or more signals through an optic fiber from a first source to a second source. At the light receiving end of this configuration, it is necessary to have a fiber optic connector assembly which generally includes the following:

an optoelectronic device for detecting light through a lens and producing a signal in response thereto, a housing to receive the optoelectronic device having an opening in alignment with the lens, and a means including an optic fiber for transmitting light therethrough which is insertable into the housing through the opening in alignment with the lens.

In most of the applications for such a connector assembly, the light transmitting means is intended to be mated with the optoelectronic device on a permanent or semi-permanent basis. It is normally not the general purpose of such an assembly to permit cycling (insertion and withdrawal) of the light transmitting means with respect to the optoelectronic device.

In an application which requires cycling of the light transmitting means with respect to the optoelectronic device, two significant problems would arise. First, dust and/or other environmental contaminants may enter the housing through the opening through which the light transmitting means is inserted. Another problem is the inadvertent triggering of the optoelectronic device due to stray light being received through the opening of the housing.

SUMMARY OF THE INVENTION

It is, therefore, the principal object of the present invention to provide a new and improved fiber optic connector assembly of the type described above which allows cycling, i.e., insertion and withdrawal, of the light transmitting means relative to the optoelectronic device while providing protection of the optoelectronic device when the light transmitting means is not received through the opening in the housing.

These and other objects of the invention are achieved by an improvement which comprises:

a resilient door associated with said housing which normally covers and is biased against said opening when said light transmitting means is not inserted in said housing and movable away from said opening in response to insertion of the light transmitting means therethrough.

DESCRIPTION OF THE PREFERRED EMBODIMENT

Figure 1:
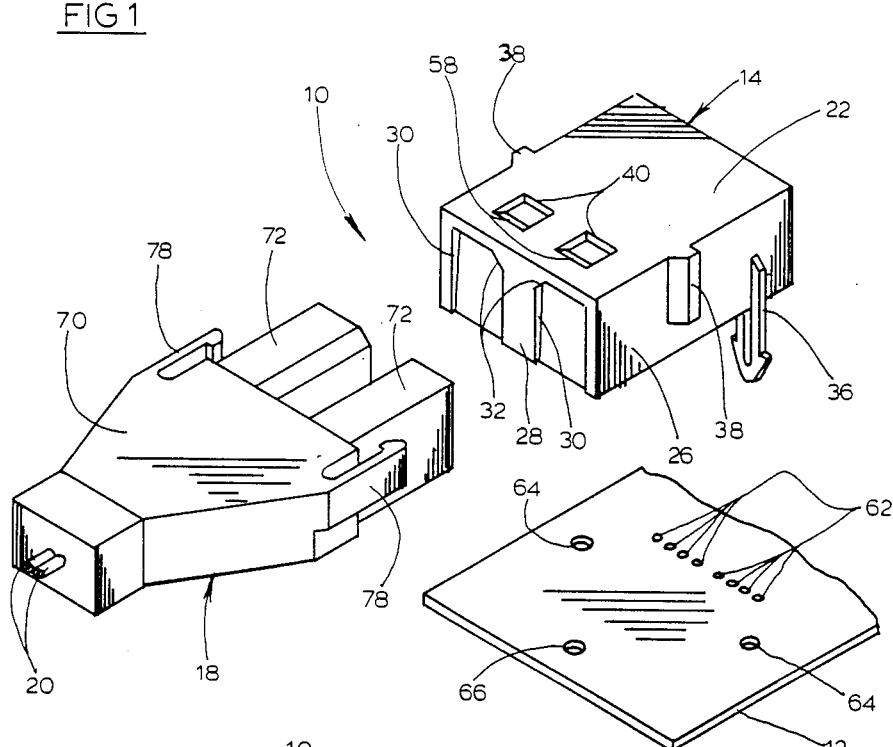
FIG. 1 is a partially exploded perspective view of the fiber optic connector assembly of the present invention.
Figure 2:
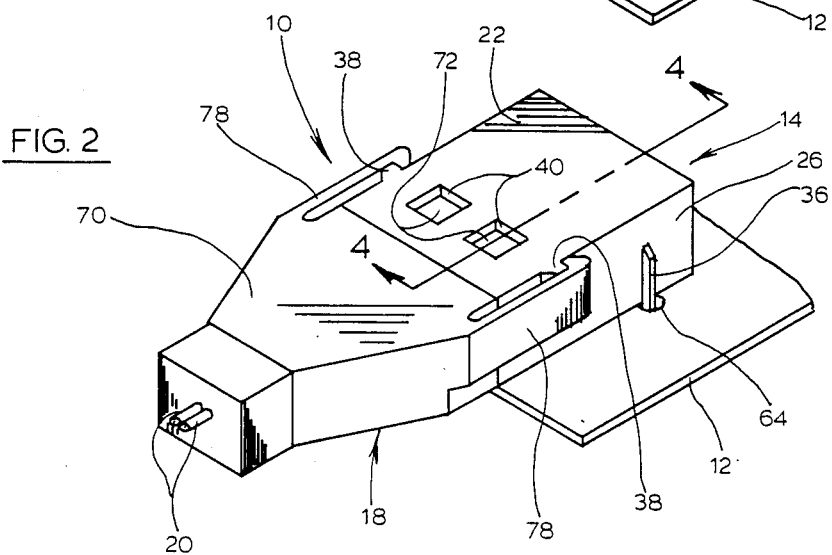
FIG. 2 is a perspective view of the fiber optic connector of the present invention fully mated on a printed circuit board.

Turning now to the drawings, the fiber optic connector assembly of the present invention, generally designated 10, is shown and is designed to be mounted on a printed circuit board 12. The connector assembly 10 generally includes a housing, generally designated 14, which is adapted to receive two optoelectronic devices 16 which detect light and produce an electrical signal in response thereto. The housing 14 is adapted to mate with plug, generally designated 18, which receives and mounts two light transmitting optic fibers 20 which transmit light from another source (not shown).

The housing 14 has a top wall 22 and a parallel spaced apart floor 24. The top 22 and floor 24 are joined by two other sidewalls 26 and a intermediate wall 28 parallel thereto. The leading edges of the top 22, floor 24, sidewalls 26 and intermediate wall 28 defined two openings 30 through which portions of the plug 18 may be received.

The openings 30 have an irregular polarizing surface 32 in the upper corner thereof. Depending from the floor 24 of the housing 14 is a strain relief peg 34. Two mounting legs 36 are formed on the outer sidewalls 26 for mounting the housing 14 to the printed circuit board 12. The outer sidewalls 28 also each has a latching boss 38 formed thereon for purposes which become more apparent hereinafter. The top wall 22 has a pair of apertures 40 formed therein, one over each opening 30.

Figure 4:
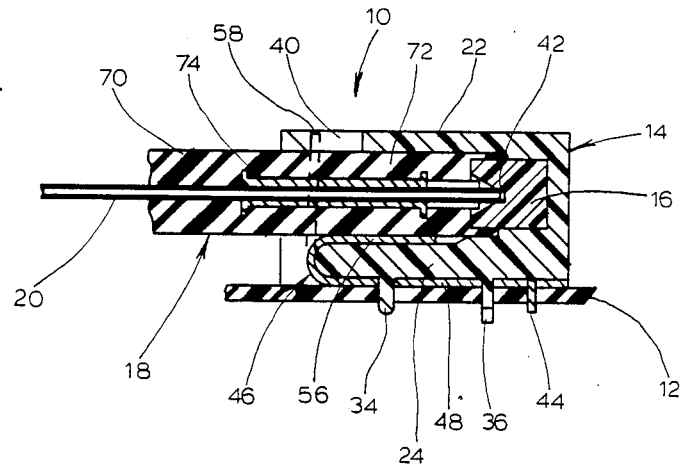
FIG. 4 is a sectional view taken generally along the line 4—4 of FIG. 2.

Looking at FIG. 4, each optoelectronic device 16 has a lens 42 (only one shown), one corresponding to each opening 30. Depending from each optoelectronic device 16 is a plurality of solder leads 44 which are adapted to be received through the housing floor 24 for electrical connection to the printed circuit board 12.

Figure 3:
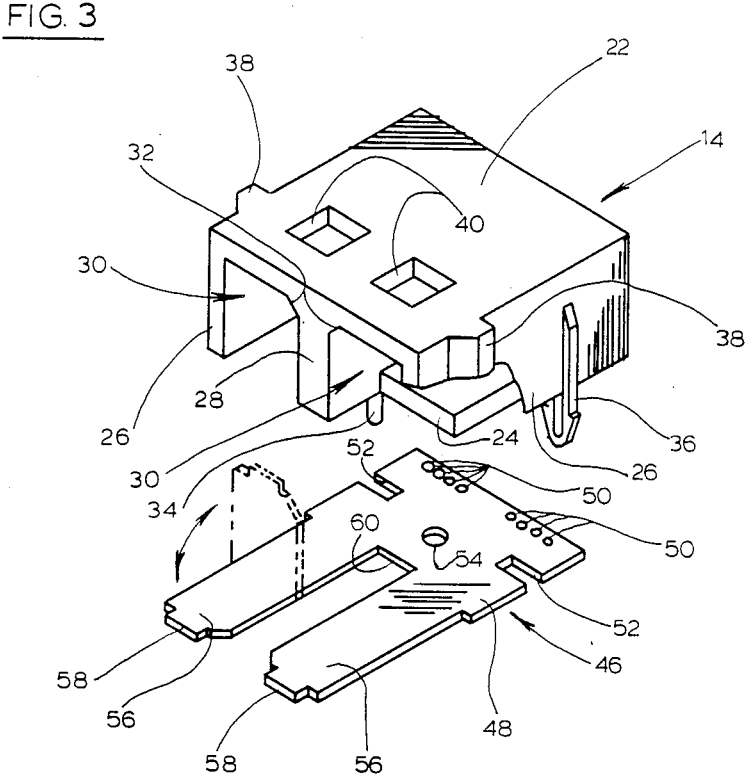
FIG. 3 is an exploded perspective view of the housing comprising a part of the fiber optic connector assembly of the present invention.

Looking at FIG. 3, a generally flat member, generally designated 46, is made of resilient material such as thin metal and is adapted to be mounted at the bottom of the housing 14 between the floor 24 and the printed circuit board 12. It is intended that the member 46 is to be bent in an L-shape as is illustrated in phantom in FIG. 3 and in section in FIG. 4.

The first leg portion 48 or horizontal portion of member 46 is seen to include a plurality of small holes 50 through which the optoelectronic device solder leads 44 are received. The first leg portion 48 also includes a pair of side notches 52 through which the mounting legs 36 are received and a centrally located hole 54 through which the polarizing peg 34 is received.

The second leg portion of member 46 defines two doors 56 of the same configuration, each having a tab 58 extending from the end thereof. The doors 56 are adapted to cover the openings 30.

In order to mount the member 46 as part of the assembly 10, the tabs 58 are received in the apertures 40 which retain the doors 56 adjacent openings 30. The first leg portion 48 is then bent around the housing floor 24 so that member 46 assumes its L-shaped configuration. When in the L-shaped configuration, the solder leads 44, mounting legs 36 and polarizing peg 34 are received through holes 50, notches 52 and hole 54, respectively. The doors 56 are separated and do not interfere with the intermediate wall 28 due to a cut out 60 formed therebetween in the member 46.

The housing 14 and member 46 are then mounted on the printed circuit board 12 so that the solder leads 44 are received through holes 62, the mounting legs 36 are received through holes 64 and the polarizing peg 34 is received through hole 66. The printed circuit board 12 is then wave soldered so that the solder leads 44 of the optoelectronic devices 16 are soldered to the circuitry formed thereon.

The plug 18 has a hand held portion 70 which is adapted to be gripped to insert or withdraw the plug and two forward portions 72 having the same configuration as openings 30. Portions 72 are adapted to be received through openings 30 so that the ends thereof will be in close proximity to the lens of the optoelectronic devices 16 when inserted into the housing 14.

Each optic fiber 20 has a ferrule 74 crimped therearound. The crimped fiber 20 is then mounted within the plug 18 as is best shown in FIG. 4. The ferrule 74 not only serves to mount each fiber 20 within the plug 18, but also relatively positions each fiber 20 so that the end thereof is aligned with and adjacent to its respective lens 42.

When plug 18 is inserted into the housing 14, the forward portions 72 press against doors 56. Upon further insertion, the doors 56 move from the position shown in phantom in FIG. 4 to a flat position along the top of the floor 24 as is shown in FIG. 4. The plug 18 is held in this mating position with the housing 14 by the interengagement of the ends of flexible latching arms 78 formed on the sides of the plug with latching bosses 38.

Due to the configuration and resiliency of member 46, the doors 56 are normally biased against openings 30. Thus, when the plug 18 is not mated with housing 14, the doors 56 prevent dust and other environmental contaminants as well as stray light from entering the housing. When the plug 18 is mated to the housing 14, the doors swing out of the way as is shown in FIG. 4 thus allowing alignment of the optic fibers 20 with the lenses 42 of the optoelectronic device 16.

The present embodiment discloses a pair of optoelectronic devices 16 which are to be mated with the ends of two optic fibers 20. However, it is understood that the invention claimed herein would be applicable to one or more optoelectronic devices which mate with a corresponding number of optic fibers.

We claim:

1. A fiber optic connector assembly including
   an optoelectronic device for detecting light through a lens and producing an electrical signal in response thereto;
   a housing to receive said optoelectronic device, said housing having an opening in alignment with said lens;
   light transmitting means having an optic fiber for transmitting light therethrough and a plug secured to end thereof, said plug having a forward portion of substantially the same cross section of said opening which is selectively insertable into the housing through said opening in alignment with said lens; and
   means for blocking said opening when the plug is not received therein; the improvement in said blocking means comprising:
   a generally L-shaped member made of resilient sheet material having a first leg secured to a part of the housing and a second leg forming a light-tight door which is biased against the interior of the opening and pivotably moveable away from the opening towards the interior of the housing so as to lie in a direction substantially parallel to the direction of insertion of said plug in response to the insertion of the plug,
   whereby the forward portion of the plug engages said door and moves it from the opening as it is inserted therethrough.

2. The assembly of claim 1 including interengaging latch means formed on the plug and housing for holding the plug in mating relationship with the housing when said forward portion is received through said opening.

3. The assembly of claim 1 wherein said housing includes stop means formed therein, and said second leg includes a tab formed at the end thereof for engaging said stop means when the second leg covers the opening.

4. The assembly of claim 1 wherein said member is made of sheet metal.

5. The assembly of claim 1 wherein said second leg is deflected by said forward portion as said plug is inserted into said housing, so as to form a reverse bend in said member, with said first and said second legs being substantially coextensive and overlying each other.

* * * * *